United States Patent
Mathew et al.

(10) Patent No.: US 11,743,027 B2
(45) Date of Patent: Aug. 29, 2023

(54) DECENTRALIZED METHODS AND SYSTEMS FOR STORAGE, ACCESS, DISTRIBUTION AND EXCHANGE OF ELECTRONIC INFORMATION AND DOCUMENTS OVER THE INTERNET USING BLOCKCHAIN TO PROTECT AGAINST CYBER ATTACKS AND THEFT

(71) Applicants: Johny Mathew, Palo Alto, CA (US); Nitin Duggal, San Jose, CA (US)

(72) Inventors: Johny Mathew, Palo Alto, CA (US); Nitin Duggal, San Jose, CA (US)

(*) Notice: Subject to any disclaimer, the term of this patent is extended or adjusted under 35 U.S.C. 154(b) by 67 days.

(21) Appl. No.: 16/834,585

(22) Filed: Mar. 30, 2020

(65) Prior Publication Data

US 2021/0306133 A1 Sep. 30, 2021
US 2022/0337388 A9 Oct. 20, 2022

Related U.S. Application Data

(60) Provisional application No. 62/912,313, filed on Oct. 8, 2019.

(51) Int. Cl.
*H04L 9/00* (2022.01)
*H04L 9/32* (2006.01)
*H04L 9/06* (2006.01)

(52) U.S. Cl.
CPC ............ *H04L 9/002* (2013.01); *H04L 9/0637* (2013.01); *H04L 9/3236* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 9,992,022 B1* | 6/2018 | Chapman | G06F 21/64 |
| 2010/0100743 A1* | 4/2010 | Ali | H04L 63/0457 |
| | | | 713/176 |
| 2013/0263274 A1* | 10/2013 | Lamb | H04L 63/12 |
| | | | 709/204 |
| 2015/0213404 A1* | 7/2015 | Follis | G06F 21/6209 |
| | | | 705/317 |
| 2018/0336202 A1* | 11/2018 | Jahanbakhsh | G06F 16/248 |
| 2018/0351830 A1* | 12/2018 | Kenna, III | G06F 16/958 |
| 2019/0332783 A1* | 10/2019 | Bhardwaj | H04L 9/3239 |
| 2019/0356481 A1* | 11/2019 | Spector | G06Q 20/065 |
| 2019/0394242 A1* | 12/2019 | Wig | H04L 9/3093 |
| 2020/0134221 A1* | 4/2020 | Su | H04L 9/0637 |
| 2020/0175080 A1* | 6/2020 | Bethge | G06F 16/355 |
| 2020/0380537 A1* | 12/2020 | Fan | G06Q 30/0281 |

* cited by examiner

*Primary Examiner* — Kaveh Abrishamkar
(74) *Attorney, Agent, or Firm* — Mahamedi IP Law LLP (57) ABSTRACT

Decentralized systems and methods provide smart contracting when electronic information is exchanged between authorized and permitted user(s) where creating, uploading, accessing, viewing, editing, redlining, replying, printing, downloading, e-signing and or marking up are each stored as separate immutable blocks within the permission based blockchain allowing the system to securely track the version history and users activity to enforce legally binding and verification processes.

16 Claims, 8 Drawing Sheets

DECENTRALIZED METHODS AND SYSTEMS FOR STORAGE, ACCESS, DISTRIBUTION AND EXCHANGE OF ELECTRONIC INFORMATION AND DOCUMENTS OVER THE INTERNET USING BLOCKCHAIN TO PROTECT AGAINST CYBER ATTACKS AND THEFT

TECHNICAL FIELD

Blockchain technology (sometimes simply referred to as blockchain) is a decentralized system and methodology. The blockchain is a data structure that stores a list of exchanges and can be viewed as a distributed electronic ledger that records information exchanges between source identifier(s) and destination identifier(s). The information exchanges are bundled into blocks and every block (except for the first block) refers back to or is linked to a prior block in the chain. Computer nodes maintain the blockchain and cryptographically validate each new block and thus the information exchanges contained in the corresponding block. This validation process includes solving a computationally difficult problem that is also easy to verify and is sometimes called a "proof-of-work."

The integrity (e.g., confidence that a previously recorded exchange has not been modified) of the entire blockchain is maintained because each block refers to or includes a cryptographic hash value of the prior block. Accordingly, once a block refers to a prior block, it becomes difficult to modify or tamper with the data (e.g., the information) contained therein. This is because even a small modification to the information will affect the hash value of the entire block. Each additional block increases the difficulty of hacking, tampering and or stealing the contents of an earlier block. Thus, even though the contents of a blockchain may be available for all to see, they become practically immutable.

BACKGROUND

Embodiments of the present disclosure relate to storing, accessing, distributing, collaborating and or exchanging information securely and more particularly to system and methods that uses blockchain to protect the information and method for the users during transmission, storage and execution that automatically enforces legally binding and verification process.

A network designed to create a content-addressable, peer-to-peer method of storing and sharing hypermedia in a distributed file system that is decentralized for more security compared to traditional systems to protect against data theft, cyber attacks and tampering. This application allows users to not only store content, but also access, collaborate and distribute content. As opposed to a centrally located server this application is built around a decentralized system of user-operators who hold a portion of the overall data, creating an immutable and impenetrable security system of file storage, sharing, distribution and exchange where the security controls always reside with the authorized user(s).

This platform provides authorized users to automatically enter into a smart contract in the exchange of information including accessing, uploading, marking-up, editing, signing that is legally binding, where the information exchange is stored and tracked in the native blockchain using a public key & private key pair for cyber security against data theft, tampering and cyber attacks.

BRIEF DESCRIPTION OF THE FIGURES & DETAILED DESCRIPTION

Figure 1:
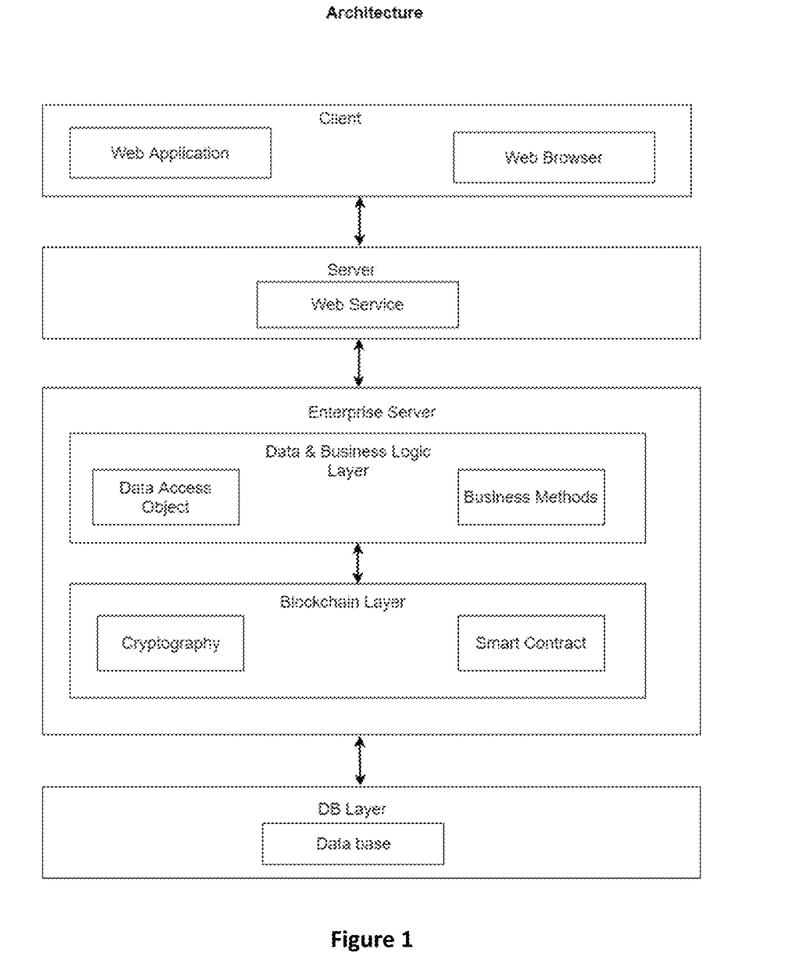

FIG. 1 show the overview of the architecture design of the native blockchain application; first layer is the user interface which is accessed using a web browser client. The second layer of the architecture is the web server, this is the layer where application is hosted, server can be Microsoft Azure, AWS, Apache web server etc. The third layer is the server in which both the data and business logic is located. Business logic is the portion of an application system which determines how data is transformed or calculated, and how it is routed to user or software (workflow). The data access layer allows the client (or user) modules to be created with a higher level of abstraction. The data access objects & business methods interact with the blockchain security layer in order to create blocks, fetch data from the database, execute methods and systems to mine the blocks etc. The creation of the block happens in this blockchain layer. The blockchain layer has three components 1) Consensus Layer, a protocol that describes the format of rules and policies between users for smart contracting to automatically enforce legally binding and verification processes. The protocol must also allow new blocks to be added to the chain in the database. 2) Mining layer: Blocks are mined in order to validate the exchanges (proof of work) for security purposes. 3) Propagation layer: a protocol that determines how the blocks are transmitted between nodes in the network. The final layer is the database. All the transactions blocks including folders, subfolders, documents, text and other transactions are stored in MS SQL database.

Figure 2:
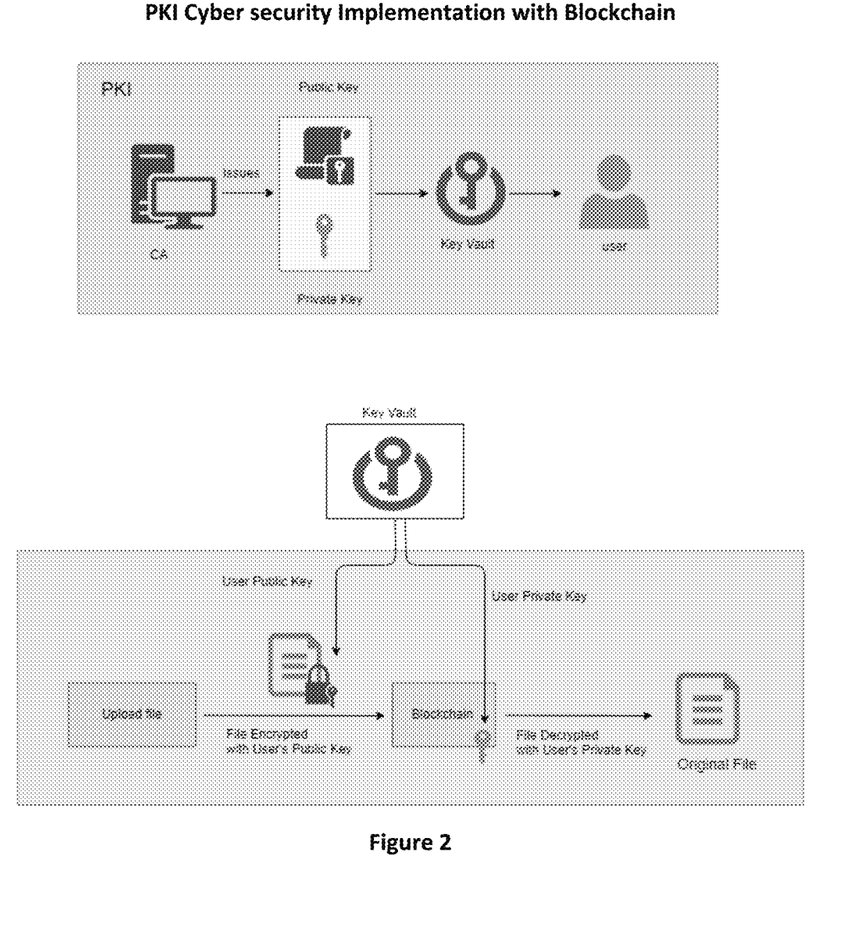

FIG. 2 shows working of the PKI with blockchain in which the server uses public key infrastructure (PKI) for generation of the private and public keys for the authorized user during registration. Here certification authority (CA) will be either owned by the business itself or by the certificate providers. Public key and private key are issued by the CA to the user(s) and or business(es). Both public and private keys are stored in key vault and the vault reference is stored in the enterprise server database.

Figure 3:
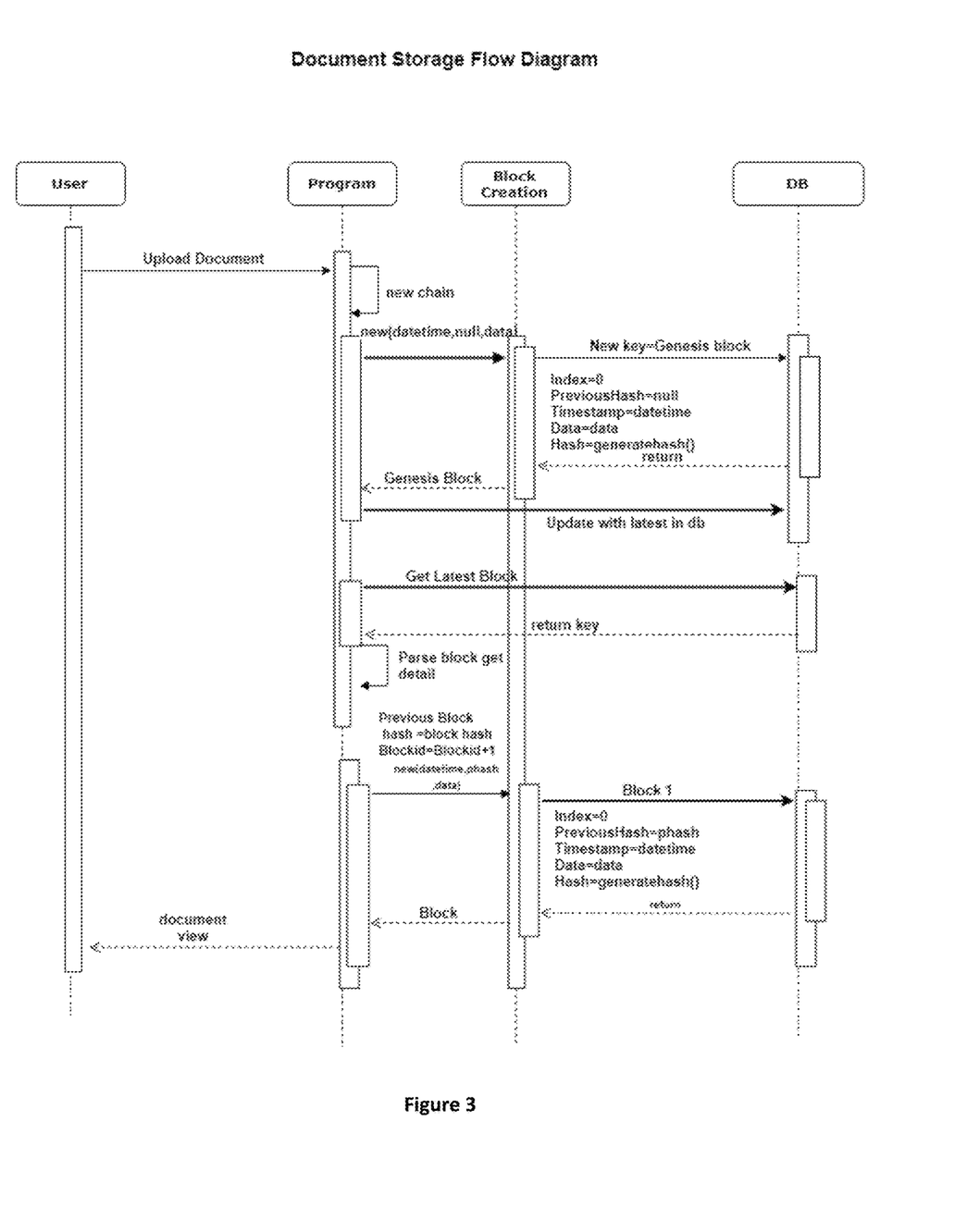

FIG. 3 diagram illustrates the process of creating and storing the document in native blockchain system. For example, when user "A" uploads an image i.e. the file is received by the API (blockchain layer) in base64 format, the metadata associated with the document i.e. user id, role id, account id, folder id, subfolder id, document details such as format of the file in this example it is a picture, format of the picture could be .PNG, JPEG etc., picture size could be KB, MB etc., and all these corresponding details are collected in creating the block.

Figure 4:
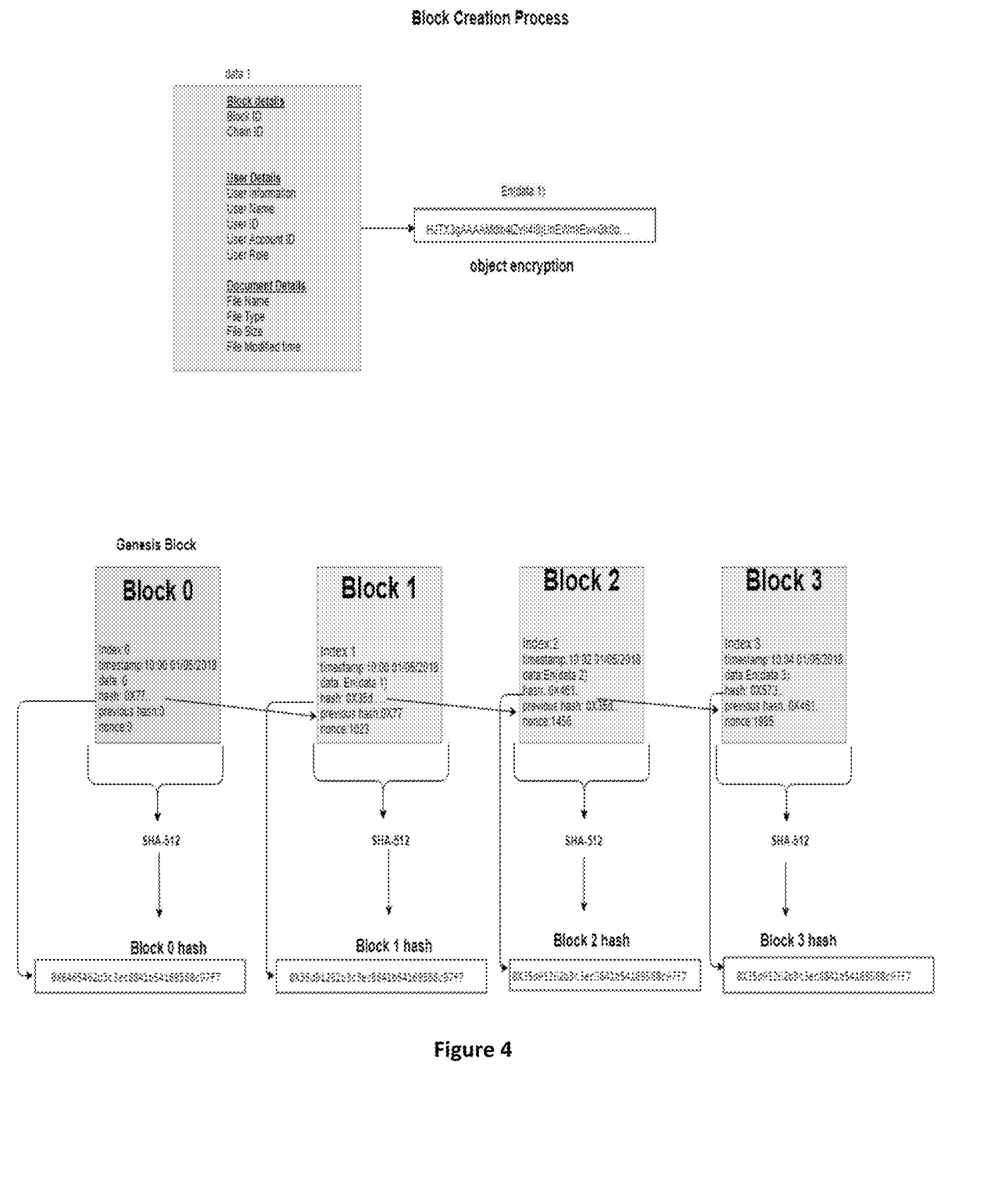

FIG. 4 shows the creation of the block, where the metadata is encrypted to create the object type block consisting of Index in order to identify the block, timestamp: time at which the block is created, previous hash: hash of the previous block, hash: hash of the current block & nonce (numbers of iteration required to create a hash) fields. The first block will be a genesis block and it will not have previous block value or data.

GENERATION OF HASH

The hash is generated with Index, Timestamp, Previous hash, Hash, Nonce using SHA-512. At the beginning, a Genesis block is created to start the blockchain. In the Genesis block, data will be empty and this can be kept empty or any data can be added. Figure gives the hash value of the Genesis block which in this case is 0X6465462b3c3ec8841b54169588c97f7. This hash value will become the previous hash value in Block1.

The blocks original form will be OBJECT type. In Block1, the file uploaded by the user is encrypted (as shown in FIG. 4) HJTX3gAAAAMdib4lZvIi4I8jUnEWnkEwvGk0o using AES algorithm and this encrypted value is set as the value of the 'data' in block1.

Data will have block details like block id, here each file is considered as block. User Details will have user's information's, user id, account id, user role. Document Details will have file name, filetype, file size, modified time, file manifest, file path. As mentioned above a hash value using Index, Timestamp, Previous hash, Hash, Nonce is generated using SHA-512 and set as the value of the "hash" in the block. And this process keeps on repeating on each upload or in case of any information exchange recorded in the system. This process prevents any cyberattack from stealing or tampering the electronic information exchanged and or stored.

Figure 5:
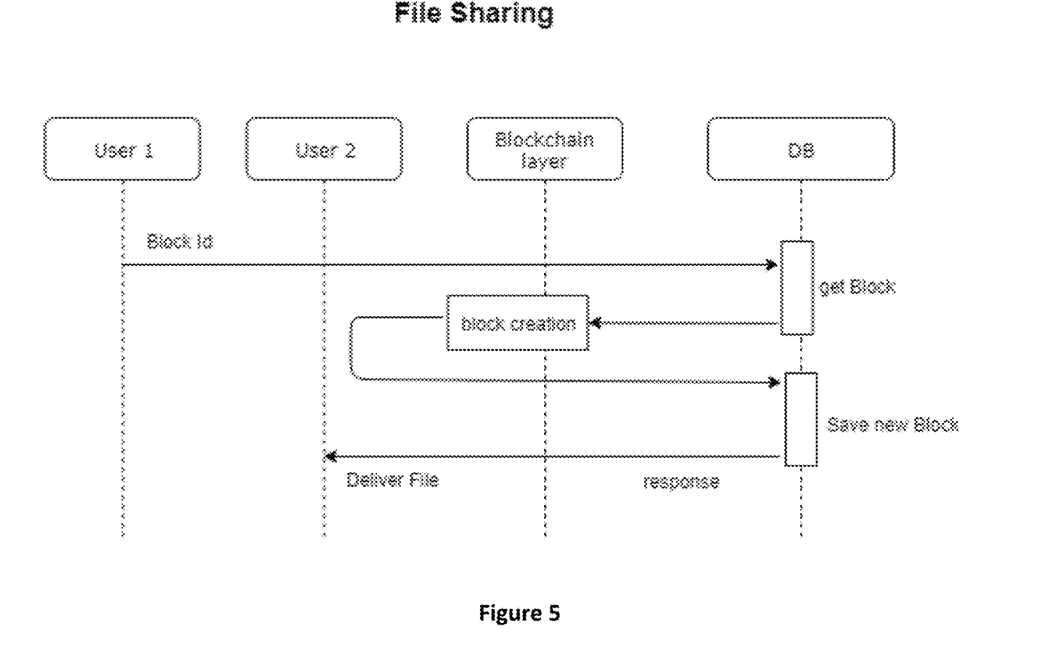

During the upload of the document private and public keys are used, authorized user's public key is used to encrypt the data for transmission to the server and is stored in the blockchain. While accessing the information the authorized user's private key is used to decrypt the electronic information. FIG. 5 illustrates exchanging electronic information in blockchain network with other users automatically creates a smart contract between the users or nodes in the blockchain network. A smart contract is a computer code running on top of a blockchain containing a set of rules under which the user(s) agree to interact with each other. If and when the pre-defined rules are met, the agreement is automatically enforced. The smart contract code facilitates, verifies, and enforces the negotiation or performance of an agreement, transaction or exchange. It is the simplest form of decentralized automation. In this case smart contract is only for sharing the file. The first condition to share files between users is that the users must have an account and have to be invited by the owner of the electronic information. The sharing of the file or folder makes use of PKI, user A uses user B's public key to encrypt the document which is stored as a block, user B uses his own private key from the vault to decrypt the document from the sent block, this PKI infrastructure increases the security level of electronic information exchange during transmission, access and storage. The enterprise sever maintains and protects the authorized users' private and public keys for all transactions including the creation, upload, markup, edit, comment and e-signature of the electronic information.

Figure 6:
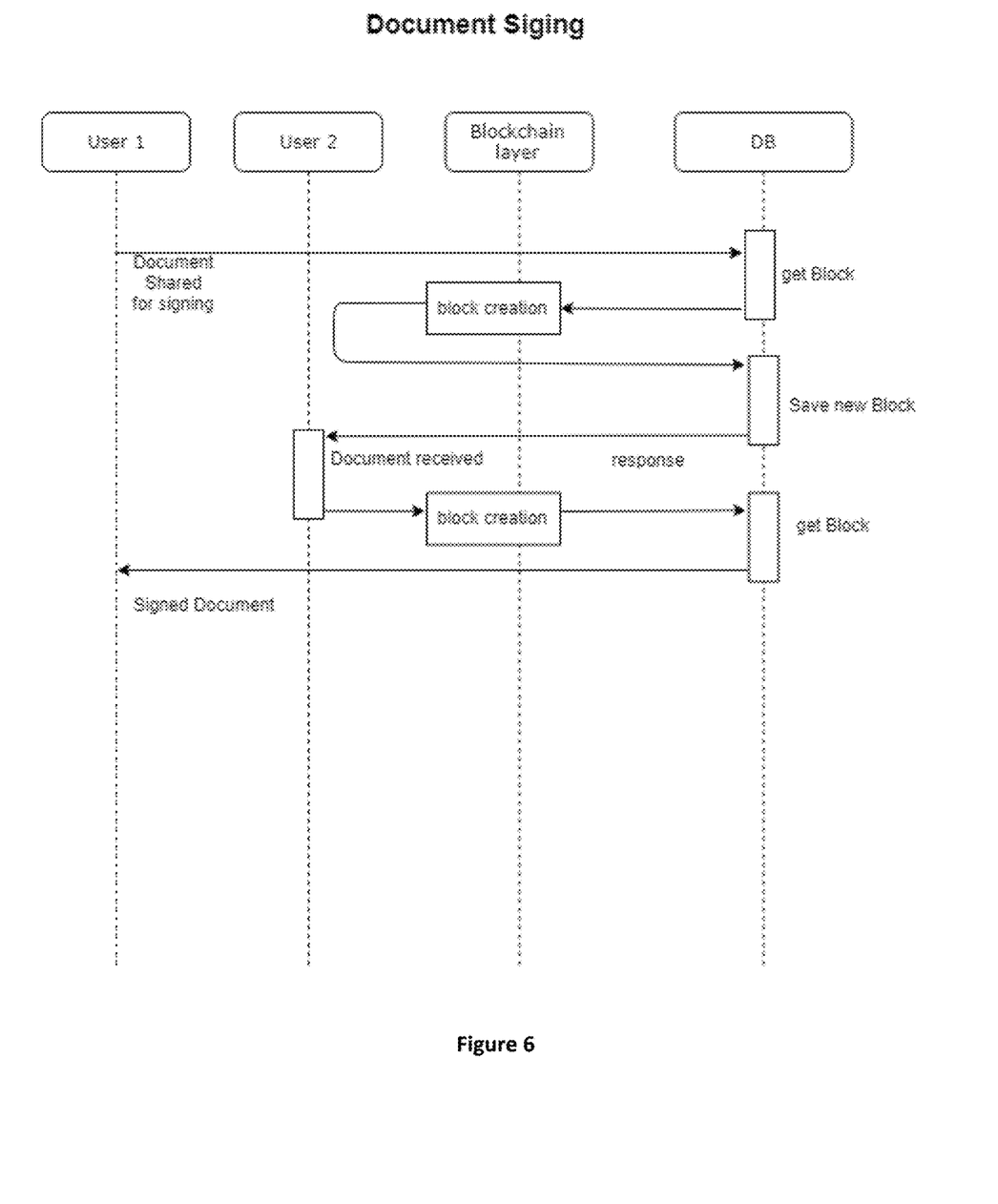

FIG. 6 illustrates document signing, it's one of the integral features of the smart contract which allows the users to sign a document electronically that is legally binding. For example, user A creates or uploads an electronic document which is represented as a block in the database. User A shares the electronic document with user B by automatically entering into a smart contract for User B's electronic signature. This allows user B to electronically sign the document, resulting in the automatic creation of a new version of the document that is stored as a new block in the database. The signed document can be accessed by both users with their respective public and private keys. This provides the users with immutable and impenetrable security of the electronic file. Similarly, smart contracting features also allows users to edit, redline, comment, esign, markup documents using public and private key authentication where the credentials are shared using smart contracting, resulting in the creation of new versions of the document saved as immutable and impenetrable blocks added within the blockchain during each information exchange with an audit log.

Figure 7:
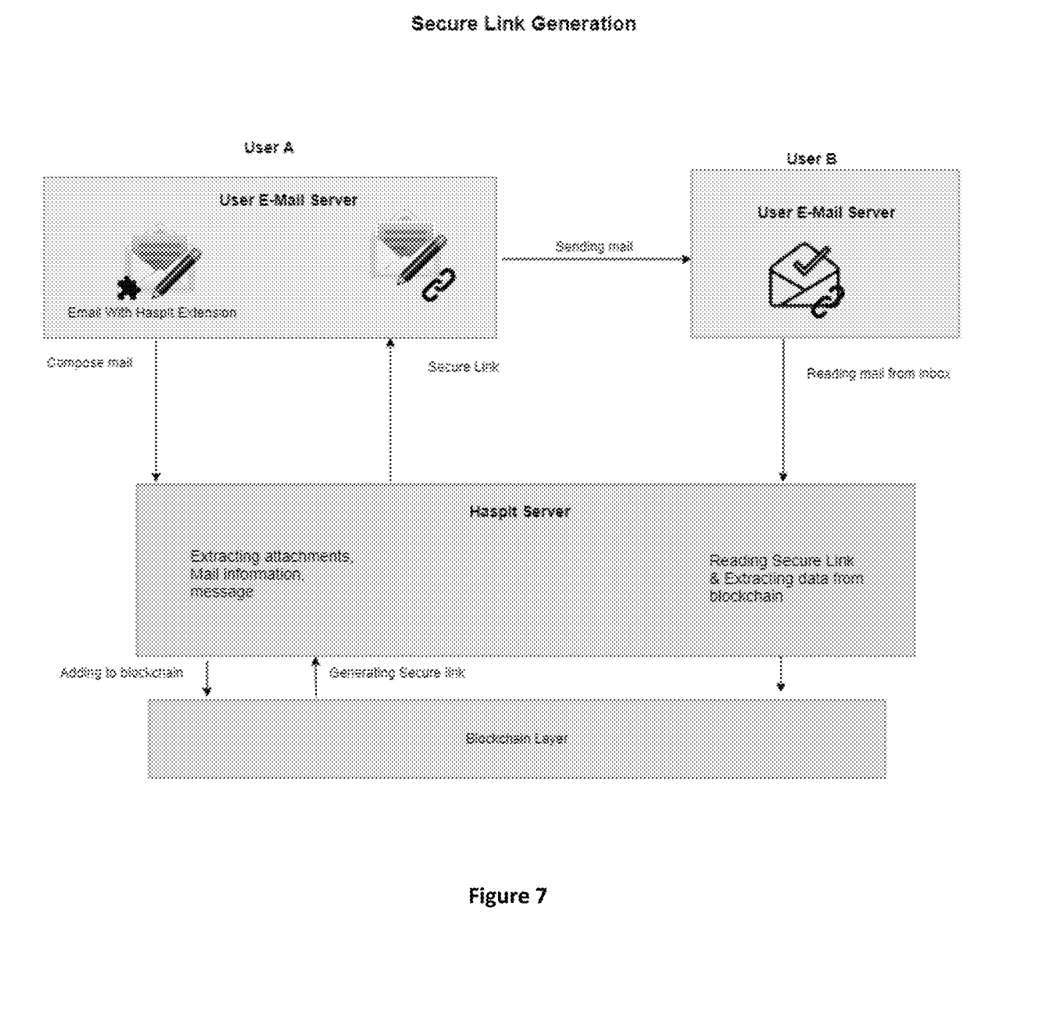
Figure 8:
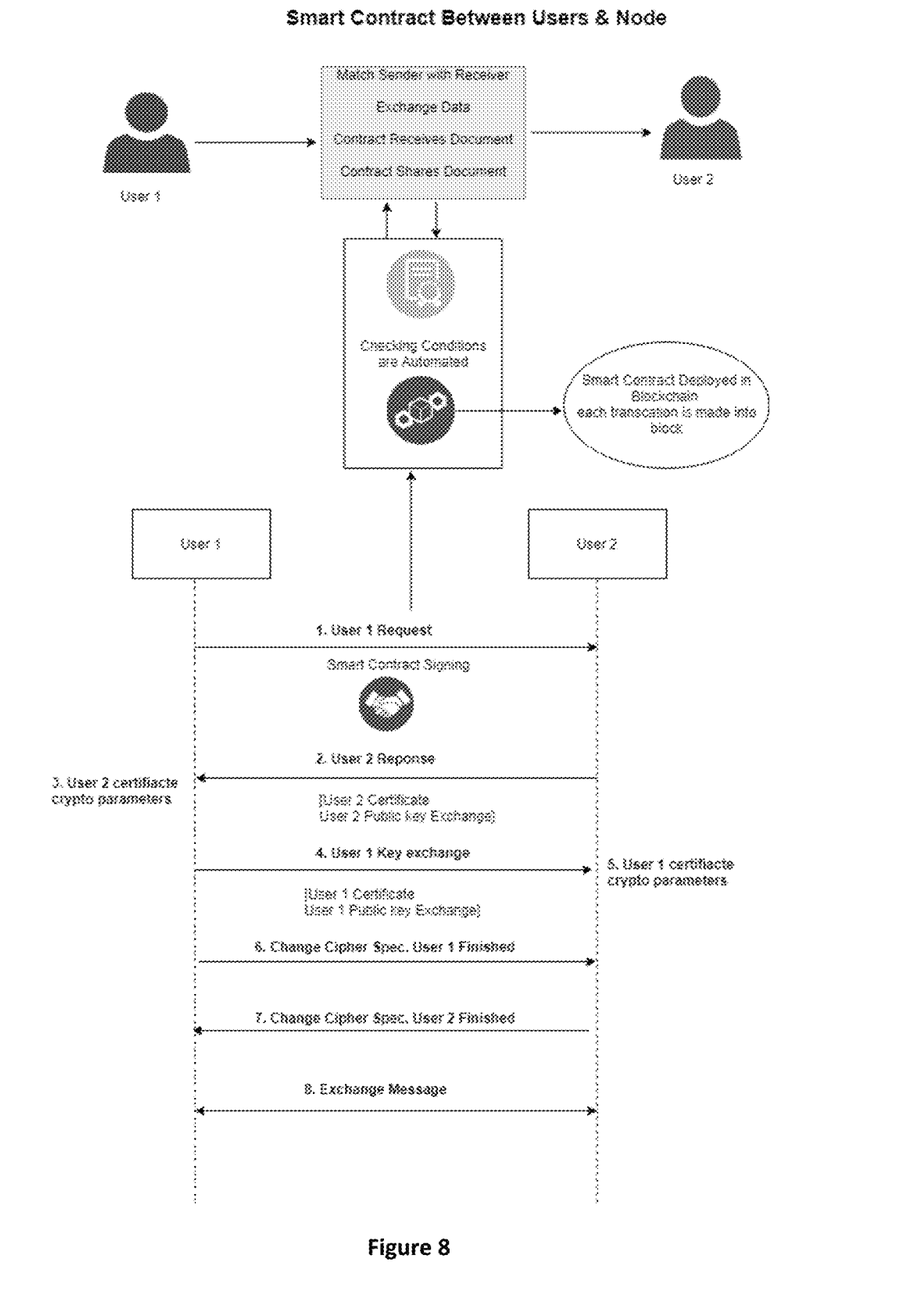

FIG. 7 illustrates generation of a secure link using an email plugin extension that can be downloaded from the respective browser stores including Chrome, Firefox, Edge etc. This email plugin extension will be added to the web mail applications for the specific browser once downloaded by the user. This extension allows the web mail server to talk to the blockchain server. All the mail information is automatically transmitted to the blockchain server when the user clicks on the plugin, resulting in an encrypted link sent to the recipients of the email. As shown in the figure user A composes the mail and clicks on the blockchain extension button which redirects the page to the blockchain server, the user's login credentials are verified. The mail attachment, message, to mail address, from mail address etc. is automatically imported into the blockchain server and added as a block in the native blockchain application. The blockchain server in return generates a secure link. This secure link is then exported to the user mail server and the previously composed mail is replaced with the secure link. User A sends this mail with secure link to user B. User B is able to view only the secure link in the email. To view the secure message, the user B must be a registered user on the blockchain application. The user B will log in to the blockchain server to view the encrypted message stored in the block which is associated with the secure link. When a document or secure email link is shared with another user in the blockchain network, a smart contract is automatically executed as shown in FIG. 8, the block in the smart contract has details of the sender, receiver, number of block that has been shared (each block represents document), and transaction Id for each transaction. A separate transaction log is maintained to account for the number of transactions done by the users. Smart contracts are automatically executed while sharing documents (i.e. through secure link sharing). Here each transaction leads to the creation of the new block, and working is as similarly to the earlier process as explained above on the creation of document stored in the blockchain network. The smart contract is stored in the database layer. The smart contract and the block chain technology protects the user's data from being hacked, tampered and or stolen during transmission, sharing and storage over the Internet including on $3^{rd}$ party mail and web servers.

Mobile Application has been designed to provide users access to the blockchain file system on mobile devices including phone, tablets and or watches. In addition, the users will be able to send text messages, upload electronic information including images, videos, files from their mobile phone and tablets on the blockchain server to protect against it from being stolen, tampered and or accessed by non-authorized users. The request will be processed similar to the web application by making calls to a web API. The request is forwarded to the blockchain layer for the creation of the block, else folder or subfolder is created. The remaining block creation, storing, validation, proof of work process will be identical to the web application as described in the above document.

The invention claimed is:

1. A computer-implemented method comprising:
   importing message information into a block of a blockchain, the message information including a message composed by a first user for a second user using a mail server;
   generating a secure link that corresponds to the composed message;

exporting the secure link to the mail server to cause the mail server to replace the message composed by the first user with the secure link, the secure link included in a message for the second user; and authenticating the second user to enable the second user to view the message composed by the first user;

wherein authenticating the second user includes automatically executing a smart contract that is maintained on the blockchain; and based on the smart contract, creating one or more additional blocks on the blockchain to store information about one or more transactions performed by the second user with respect to the message composed by the first user.

2. The method of claim 1, wherein the one or more transactions are performed by the second user with respect to a document that is included with the message composed by the first user.

3. The method of claim 2, wherein the one or more transactions include (i) editing or marking up the document, (ii) commenting on the document, or (iii) electronically signing the document.

4. The method of claim 2, further comprising:
storing a new version of the document with the one or more additional blocks, wherein the new version of the document stores includes data corresponding to the transaction.

5. The method of claim 1, wherein the method further comprises:
providing a plugin for the first user to trigger importing of the message information to a network system on which the blockchain is maintained.

6. The method of claim 5, wherein the plugin is web-based.

7. The method of claim 1, wherein the message corresponds to an email.

8. The method of claim 1, wherein the message corresponds to a text message.

9. A network system comprising:
one or more servers configured to perform operations that include:
importing message information into a block of a blockchain, the message information including a message composed by a first user for a second user using a mail server;
generating a secure link that corresponds to the composed message;
exporting the secure link to the mail server to cause the mail server to replace the message composed by the first user with the secure link, the secure link included in a message for the second user; and
authenticating the second user to enable the second user to view the message composed by the first user;
wherein authenticating the second user includes automatically executing a smart contract that is maintained on the blockchain; and
based on the smart contract, creating one or more additional blocks on the blockchain to store information about one or more transactions performed by the second user with respect to the message composed by the first user.

10. The network system of claim 9, wherein the one or more transactions are performed by the second user with respect to a document that is included with the message composed by the first user.

11. The network system of claim 10, wherein the one or more transactions include (i) editing or marking up the document, (ii) commenting on the document, or (iii) electronically signing the document.

12. The network system of claim 10, wherein the operations comprise:
store a new version of the document with the one or more additional blocks, wherein the new version of the document stores includes data corresponding to the transaction.

13. The network system of claim 9, wherein the network system further comprises:
providing a plugin for the first user to trigger importing of the message information to a network system on which the blockchain is maintained.

14. The network system of claim 13, wherein the plugin is web-based.

15. The network system of claim 9, wherein the message corresponds to an email.

16. The network system of claim 9, wherein the message corresponds to a text message.

* * * * *